United States Patent [19]

Israel

[11] Patent Number: 4,520,481
[45] Date of Patent: May 28, 1985

[54] DATA-HANDLING SYSTEM FOR THE EXCHANGE OF DIGITAL MESSAGES BETWEEN TWO INTERCOMMUNICATING FUNCTIONAL UNITS

[75] Inventor: John W. Israel, Dallas, Tex.

[73] Assignee: Italtel—Societa Italiana Telecomunicazioni S.P.A., Milan, Italy

[21] Appl. No.: 417,370

[22] Filed: Sep. 13, 1982

[51] Int. Cl.$^3$ .............................................. G06F 11/10
[52] U.S. Cl. ..................................................... 371/37
[58] Field of Search .............................. 371/37, 39, 40

[56] References Cited

U.S. PATENT DOCUMENTS

| | | | |
|---|---|---|---|
| 3,273,119 | 9/1966 | Helm | 371/37 |
| 3,319,223 | 5/1967 | Helm | 371/37 |
| 3,439,329 | 4/1969 | Betz et al. | 371/37 |
| 4,242,752 | 12/1980 | Herkert | 371/37 |

*Primary Examiner*—Charles E. Atkinson
*Attorney, Agent, or Firm*—Karl F. Ross; Herbert Dubno

[57] ABSTRACT

Two intercommunicating functional units, namely a master unit such as a processor and an associated peripheral or slave unit, exchange 32-bit messages—with 24 information bits followed by 8 cyclic redundancy bits—by way of a control unit and upon initiation by the master unit. A receiving section of each functional unit includes a redundancy generator which, on the basis of the information bits of an incoming message, recalculates the redundancy bits in accordance with a predetermined polynomial code and sends the result to the control unit which has a similar redundancy generator responsive to the information bits of a transiting message for recalculating the same redundancy bits. The control unit compares the locally generated redundancy bits with those of the transiting message and those sent back from the message-receiving unit; in the event of a discrepancy, it identifies one or the other functional unit as the site of a detected error.

7 Claims, 4 Drawing Figures

DATA-HANDLING SYSTEM FOR THE EXCHANGE OF DIGITAL MESSAGES BETWEEN TWO INTERCOMMUNICATING FUNCTIONAL UNITS

FIELD OF THE INVENTION

The present invention relates to a data-handling system for the exchange of digital messages between two intercommunicating functional units and more particularly, to a circuit arrangement adapted to detect the present of errors in a message exchanged between a pair of transceiving functional units and to generate alarm criteria when detection gives a positive result signalling that the error is to be ascribed to the transmitting unit or to the receiving unit.

BACKGROUND OF THE INVENTION

The prior art comprises circuit arrangements designed to detect the presence of errors in a message exchanged between a pair of functional units and which comprise means, disposed in the transmitting sections, adapted to associate a prefixed number of cyclic redundance bits with the bits of each message destined to be transmitted, the said cyclic redundance bits being computed according to a predetermined polynomial arrangement.

The arrangements also comprise means which are disposed in the receiving sections and are designed to detect the presence of errors in the received message through the test of the redundance bits; should the test detect the presence of an error, an alarm criterion is generated. In case of malfunction, this circuit arrangement has the drawback of generating an alarm criterion without being able to give any information about the unit affected by said malfunction; the localization of the fault is therefore difficult.

OBJECTS OF THE INVENTION

An object of the present invention is to provide a circuit arrangement able to detect the presence of errors and to also inform whether the malfunction is to be ascribed to the transmitting section or to the receiving section.

Another object is to provide a system capable of such detection without causing delays in the transit time of the signals exchanged between said pair of units.

SUMMARY OF THE INVENTION

These objects of the present invention are attained with a circuit arrangement wherein the transmitting section of each functional unit is equipped with means designed to compute the cyclic redundance bits on the basis of the information bits of each message according to a prefixed polynomial arrangement, and further adapted to send the information bits, together with the associated cyclic redundance bits, to the receiving section of the communicating functional units by means of a control unit. The receiving section of said functional units comprises means designed to compute the cyclic redundance bits on the ground of the received messages and to send them to the control unit. This unit is adapted to compute the cyclic reduance bits on the basis of the information bits in transit, to compre them with the cyclic redundance bits extracted from the message emitted by said transmitting section and to generate a first alarm criterion in case of non-identity in the compared quantities.

The control unit further computes the cyclic redundance bits, compares them with the cyclic redundance bits computed by the receiving section and generates a second alarm criterion if non-identity in the compared quantities is detected.

The activation of the first alarm criterion and of the second alarm criterion therefore indicates a malfunction in the transmitting section and in the receiving section of said functional units. Both the control unit and the transmitting and receiving section of said functional units are so arranged as to generate the cyclic redundance bits without causing any delay on the messages, in conformity with the above mentioned purpose.

BRIEF DESCRIPTION OF THE DRAWING

Further features of the invention will become apparent from the following description, reference being made to the accompanying drawing in which.

SPECIFIC DESCRIPTION

Figure 1:
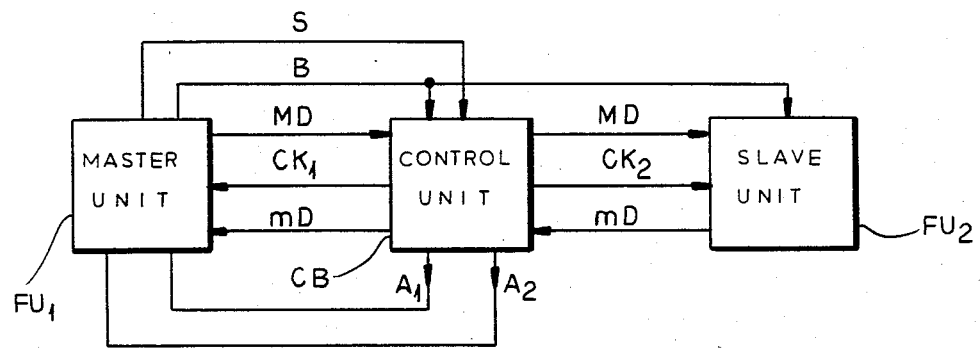
FIG. 1 is a block circuit diagram which shows the connection of the control unit to a given pair of functional units.

In FIG. 1, $FU_1$ and $FU_2$ are used to indicate a pair of functional units, e.g. consisting of either a pair of processing units or a processing unit and a peripheral unit, which are designed to exchange messages comprising 24 information bits and 8 cyclic redundance bits computed for instance according to the polynomial arrangement $x^7 + 1 = 0$, respectively a master unit $Fu_1$ and a slave unit $FU_2$.

The message transmission from unit $FU_1$ to unit $FU_2$ is performed serially by means of a wire indicated with MD, while the exchange of messages in the opposite direction is performed in a similar way be means of a wire indicated with mD.

Let us assume that unit $FU_1$ is formed by a processing unit and that unit $FU_2$ is formed by a peripheral unit of $FU_1$; in this case a transfer cycle of a message is initiated by unit $FU_1$ which generates a signal S which is received by a timing unit provided in a control unit CB. This unit also receives from unit $FU_1$ a signal B whose logic level indicates the transmission path of the message, and supplies the transmitting unit with a sequence of 32 timing impulses while supplying the receiving unit with a sequence of 24 timing impulses.

On the assumption that during the current cycle signal B provides such a polarity as to characterize unit $FU_1$ as a transmitting unit, said unit $FU_1$ receives 32 timing impulses by means of a wire indicated with $CK_1$ and sends the 32 bits of the message to unit CB by means of wire MD. Unit CB is adapted to extract from the message received at its input the 8 cyclic redundancy bits computed by unit $FU_1$ and is further adapted to compute the cyclic redundance on the ground of the 24 information bits of the message passing through it.

A first comparison circuit allocated in unit CB is adapted to generate a first alarm criterion $A_1$, in case it detects the non-identity between the cyclic redundancy bits computed by $FU_1$ and those computed by unit CB, thus signalling the presence of a malfunction in unit $FU_1$.

At the same time, the message generated by unit $FU_1$ reaches unit $FU_2$ which is equipped with means designed to compute 8 redundancy bits on the ground of the 24 information bits of the message received at its input, said means being further adapted to transfer said bits to unit CB. A second comparison circuit allocated in unit CB is designed to generate a second alarm criterion $A_2$, in case it detects the non-identity between the cyclic redundancy bits computed by unit $FU_2$ and those computed on the message in transit, thus signalling the presence of a malfunction in unit $FU_2$.

Figure 2:
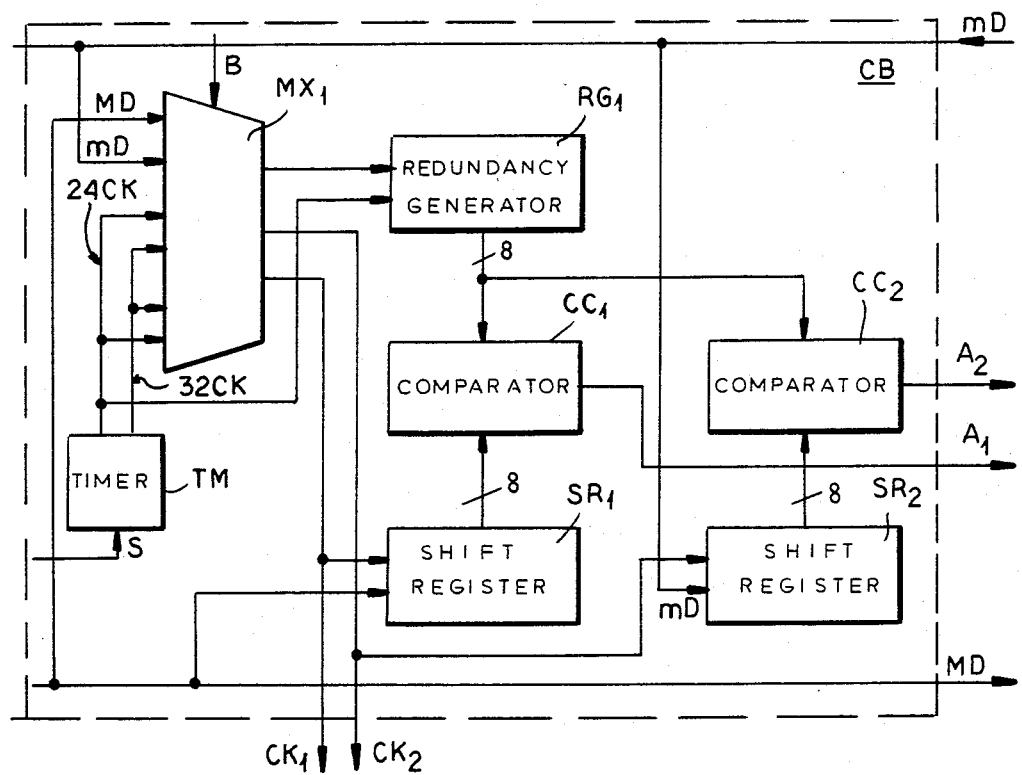
FIG. 2 is a block circuit diagram which shows in detail the control unit CB of FIG. 1.

FIG. 2 is a detailed diagram of unit CB according to FIG. 1, which provides the presence of a timing unit TM; in response to the reception of said signal S, the said unit provides at its first output the sequence 24CK of timing impuses and at its second output the sequence 32CK. The input of unit CB further receives said signal B which reaches the control input of a first multiplexer $MX_1$ comprising three sections. The first section is connected to the outputs MD and mD of units $FU_1$ and $FU_2$, the second section is connected to the outputs 24CK and 32CK of unit TM, while the third section is connected to the same outputs of unit TM, said outputs having their position reversed with respect to that of the second section. The output $CK_1$ of the third section is designed to send the timing impulses to unit $FU_1$, while the output $CK_2$ of the second section is designed to send the timing impulses to unit $FU_2$.

If unit $FU_1$ must transmit a message to unit $FU_2$, signal B will provide such a level that unit $MX_1$ renders available at the output of the first section the messages present on wire MD, whereas at the output of the second and third section it renders available the sequence of impulses 24CK and 32CK, respectively.

In response to the reception of the impulse sequence 32CK, unit $FU_1$ sends the 32 bits of a message on wire MD; such bits are sent to unit $FU_2$ simultaneously reaching the output of unit $MX_1$, to which there is connected a cyclic redundance generator $RG_1$.

The input of unit $RG_1$ receives the impulses 24CK so that it provides for computing 8 cyclic redundancy bits on the ground of the 24 information bits emitted by unit $FU_1$ and applies them to the first input of a comparison circuit $CC_1$.

Wire MD also reaches the input of a first shift register $SR_1$ providing a capacity of 8 bits and its input receives a sequence of 32 timing impulses to that at the end of said sequence it has stored the 8 cyclic redundancy bits computed by unit $FU_1$ and applies them to the second input of unit $CC_1$. This unit is arranged to activate its output $A_1$ when it detects the non-identity of the signals available at its inputs. Unit $FU_2$ receives the 32 bits of the message together with the sequence 24CK and, starting from the 17th impulse of said sequence, computes the 8 cyclic redundancy bits, as will be described below with reference to FIG. 3, and sends this sequence to unit CB by means of wire mD. Unit CB comprises a second shift register $SR_2$, whose input receives the data available on wire mD, as well as said sequence 24CK, so that during the first 16 timing impulses it stores bits providing a random value, while from the 17th to the 24th impulse it stores the cyclic redundancy bits computed by unit $FU_2$.

The outputs of unit $SR_2$ are applied to the first input of the second comparison circuit $CC_2$, whose second input receives the outputs of unit $RG_1$ and generates an alarm criterion $A_2$, if it detects the nonidentity of the quantities available at its inputs, thus signalling the presence of malfunctions in unit $FU_2$.

Figure 3:
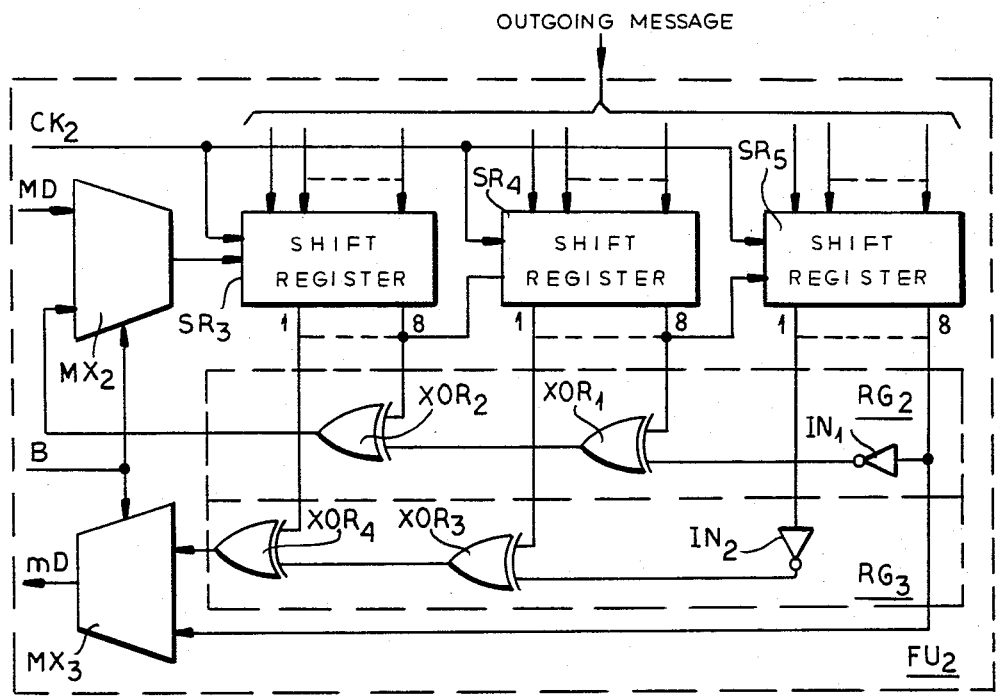
FIG. 3 is a block circuit diagram which shows in detail the transceiving circuits of the functional units of FIG. 1, according to the invention.

FIG. 3 illustrates the elements of unit $FU_2$ relevant to the invention. Said elements are not described in detail, since unit $FU_1$ can utilize elements similar to those of unit $FU_2$, as specified in the following description.

Unit $FU_2$ provides the presence of a register which is used to store both the input data and the output data and consists in fact of three shift registers $SR_3$, $SR_4$ and $SR_5$, each providing a storage capacity of 8 bits with both serial and parallel load input.

The serial load input of register $SR_3$ is connected to the output of a multiplexer $MX_2$, whose first input receives wire MD and whose second input receives the output of a cyclic redundancy generator $RG_2$.

Unit $FU_2$ receives said signal B which is applied to both the control input of unit $MX_2$ and the control input of an additional multiplexer $MX_3$, the first input of which receives the output of a third cyclic redundance generator $RG_3$ and the second input of which receives the output of register $SR_5$.

When unit $FU_2$ must receive messages from unit $FU_1$, signal B provides such a level that the output of $MX_2$ generates the bits available on wire MD, while $MX_3$ emits on wire mD the bits available at the output of unit $RG_3$ and the input-output register receives the sequence of impulses 24CK, which determine the serial storage of the information bits generated by unit $FU_1$.

During the first 16 impulses of sequence 24CK, unit $RG_3$ sends bits providing a random value on wire mD, while during the 8 bits of said sequence it generates as many cyclic redundancy bits computed on the ground of the received bits and such a redundance is sent to register $SR_2$ by unit CB.

In case the exchange of messages is performed in the opposite way, there is utilized the same register formed by units $SR_3$, $SR_4$ and $SR_5$ where the message to be sent to unit $FU_1$ is loaded in parallel. In this case signal B provides such a level that multiplexer $MX_1$ of unit CB emits the sequence of impulses 32CK on wire $CK_2$ and the outputs of multiplexers $MX_2$ and $MX_3$ respectively send the bits available at the output of unit $RG_2$ and those available at the output of register $SR_5$. During the first 8 timing impulses of sequence 32CK, unit $MX_3$ provides at its output the first 8 information bits of the message to be transmitted, which has been shifted in the register, thus emptying unit $SR_3$.

At the same time unit $RG_2$ has computed the 8 cyclic redundance bits and has transferred them into register $SR_3$ through unit $MX_2$.

The following 24 timing impulses of sequence 32CK determine the transfer on wire mD of the remaining 16 information bits and of the 8 redundance bits, which had been previously stored in unit $SR_3$.

FIG. 3 also illustrates an embodiment of units $RG_2$ and $RG_3$ which, in conformity with the above specified polynomial arrangement, consists of a first and a second exclusive OR, $XOR_1$, $XOR_2$, $XOR_3$, $XOR_4$ and of an inverting circuit IN, or $IN_2$.

Specifically for a cyclic redundance generator which operates according to the polynomial arrangement $x^7 + 1 = 0$, and in that both the second and the third cyclic redundancy generators (RG$_2$) and (RG$_3$) provide the presence in combination of the following characteristic elements:

an inverting circuit IN, IN$_2$ connected to the output $k-h+1$ of the third register;

a first exclusive OR circuit XOR$_1$, XOR$_3$, an input of which is connected to the output of the inverting circuit, while the other input is connected to the output $k-2h+1$ of the third register;

a second exclusive OR circuit XOR$_2$, XOR$_4$, an input of which is connected to the output of the first exclusive OR circuit, while the other input is connected to the first output of the third register.

Figure 4:
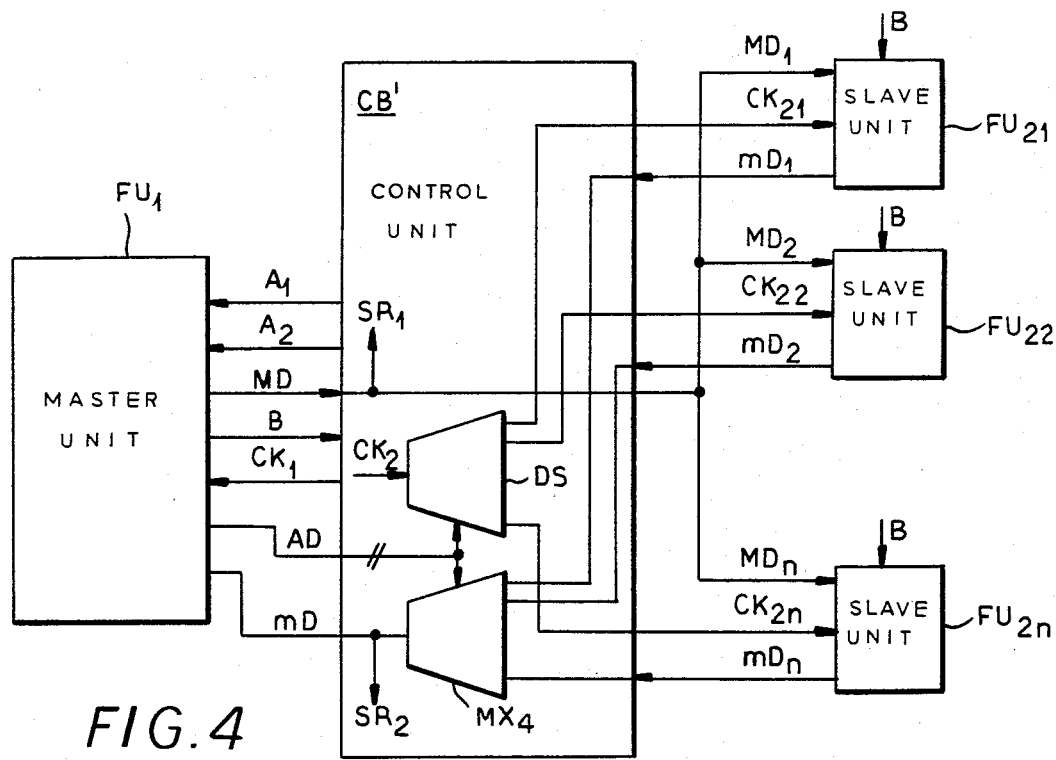
FIG. 4 is a block circuit diagram which shows another version of FIG. 1, operating on the assumption that $FU_1$ is formed by a processing unit communicating with a plurality of peripheral units $FU_2$.

In case unit FU$_1$ is formed by a unit designed to communicate with only one of units FU$_2$, FU$_1$ can be realized as shown in FIG. 3; if on the contrary unit FU$_1$ must communicate with a plurality of units FU$_2$, as illustrated in FIG. 4, it is convenient to utilize a further register (not illustrated which is formed by as many units SR$_3$, SR$_4$ and SR$_5$. A register is thus utilized to store the output data and it will be consequently connected to a unit similar to unit RG$_2$, while another register to be used for storing the input data will be consequently connected to a unit similar to unit RG$_3$.

The provision of a double register is due to the need to not limit the operative speed by means of an element which is utilized both as an input and an output device when the functional unit must communicate with a plurality of units.

According to the aforesaid assumption that unit FU$_2$ represents one of the n units communicating with unit FU$_1$, FIG. 4 shows a connection diagram of said units in which there are displayed the additional devices that unit CB must provide in this case.

Unit FU$_1$ is connected to all units FU$_2$ through wire MD, but only unit FU$_2$, which is designed to exchange messages at the considered instant, receives a sequence of timing impulses through wires CK$_2$.

Wires CK$_2$ available at the output of unit MX$_1$ (FIG. 2) are applied to the input of a signal distributor DS which is addressed by a binary configuration emitted by unit FU$_1$ on wires AD.

I claim:

1. In a data-handling system including a first functional unit and a second functional unit each provided with a transmitting section for emitting digital messages to the other functional unit and a receiving section for accepting digital messages emitted by the other functional unit, each digital message consisting of a predetermined number of k information bits followed by a predetermined number of h cyclic redundancy bits where h is an aliquot fraction of k, the combination therewith of a control unit interposed in a signal path linking said functional units with each other, said signal path having a first line for the transmission of messages from said first functional unit to said second functional unit and a second line for the transmission of messages from said second functional unit to said first functional unit, the receiving section of each functional unit including storage means for registering the information bits of an incoming message and algebraic means connected to said storage means for recalculating the associated redundancy bits according to a predetermined polynomial code, said control unit including timing means communicating with each functional unit for activating said storage means of a message-receiving functional unit and switching said algebraic means to the transmitting section thereof to command the forwarding of the recalculated redundancy bits to said control unit via the respective line of said signal path, said control unit further comprising a redundancy generator coupled with said signal path for recalculating the redundancy bits of a throughgoing message from the information bits thereof, first comparison means connected to receive the locally recalculated redundancy bits from said generator concurrently with redundancy bits arriving from said first functional unit over said first line for emitting a first alarm signal upon detecting a discrepancy therebetween, and second comparison means connected to receive the locally recalculated redundancy bits from said generator concurrently with redundancy bits arriving from said second functional unit over said second line for emitting a second alarm signal upon detecting a discrepancy therebetween.

2. The combination defined in claim 1 wherein said first functional unit is a master unit and said second functional unit is a slave unit, said master unit being provided with signaling means for initiating the emission of a message from either of said functional units by delivering a starting command to said timing means and for identifying either of said functional units as the origin of a forthcoming message by a binary discriminating signal fed to said control unit and to said slave unit.

3. The combination defined in claim 2 wherein said timing means emits a sequence of k clock pulses on a first conductor and a seqence of (k+h) clock pulses on a second conductor in response to said starting command, said control unit further including multiplexer means switchable by said discriminating signal between a first and a second position, a first h-stage shift register inserted between said first line and said first comparison means, and a second h-stage shift register inserted between said second line and said second comparison means, said multiplexer means having a first output lead extending to a data input of said redundancy generator, a second output lead extending to a stepping input of said second shift register and to said slave unit, and a third output lead extending to a stepping input of said first shift register and to said master unit, said multiplexer means connecting said first output lead to said first line, said second output lead to said first conductor and said third output lead to said second conductor in said first position and connecting said first output lead to said second line, said second output lead to said second conductor and said third output lead to said first conductor in said second position thereof, said redundancy generator having a stepping input connected to said first conductor for counting the k information bits of a throughgoing message appearing on said first output lead.

4. The combination defined in claim 3 wherein said receiving section further includes a receiving multiplexer and a transmitting multiplexer, said storage means comprising a k-stage shift register with a serial input connected to an output of said receiving multiplexer and being steppable under the control of clock pulses received from said timing means over the respective conductor thereof, said k-stage shift register being loadable in parallel with the information bits of an outgoing message, said algebraic means comprising a first bit-generating circuit with inputs connected to a first group of stages of said k-stage shift register and a second bit-generating circuit with inputs connected to a second group of stages of said k-stage shift register, said receiving multiplexer being switchable by said discriminating signal between one position connecting said serial input to the line carrying incoming messages and another position connecting said serial input to an output of said first bit-generating circuit, said transmitting multiplexer being switchable by said discriminating signal between one position connecting the line carrying outgoing messages to an output of said second bit-generating circuit and another position connecting the last-mentioned line to a serial output of said k-stage register.

5. The combination defined in claim 4 wherein said k-stage register is divided into k/h cascaded subsections of h stages each, said first bit-generating circuit comprising a first inverter connected to said serial output and a first cascade of Exclusive-OR gates the first of which has an input connected to said first inverter, each of the Exclusive-OR gates of said first cascade having an input connected to the last stage of a respective subsection other than the last subsection of said k-stage register, said second bit-generating circuit comprising a second inverter connected to the first stage of the last subsection and a second cascade of Exclusive-OR gates the first of which has an input connected to said second inverter, each of the Exclusive-OR gates of said second cascade having an input connected to the first stage of a respective subsection other than the last subsection of said k-stage register.

6. The combination defined in claim 5 wherein $k=24$, $h=8$ and the number of said subsections is three.

7. The combination defined in claim 3 wherein said second functional unit is one of several slave units communicating with said master unit by way of said control unit, said first line having a plurality of branches respectively extending to said slave units, said control unit being provided with a selector switch inserted between a portion of said second line extending to said master unit and a plurality of branches of said second line respectively extending from said slave units, said control unit being further provided with a demultiplexer for directing the clock pulses from said second output lead to any of a plurality of extension leads respectively terminating at said slave units, said selector switch and said demultiplexer being jointly settable by an address code emitted by said master unit.

* * * * *